J. SIMPSON.
Assignor of one-half Interest to Dick & Church.
METAL-BORING MACHINES.
No. 7,819. Reissued July 31, 1877.
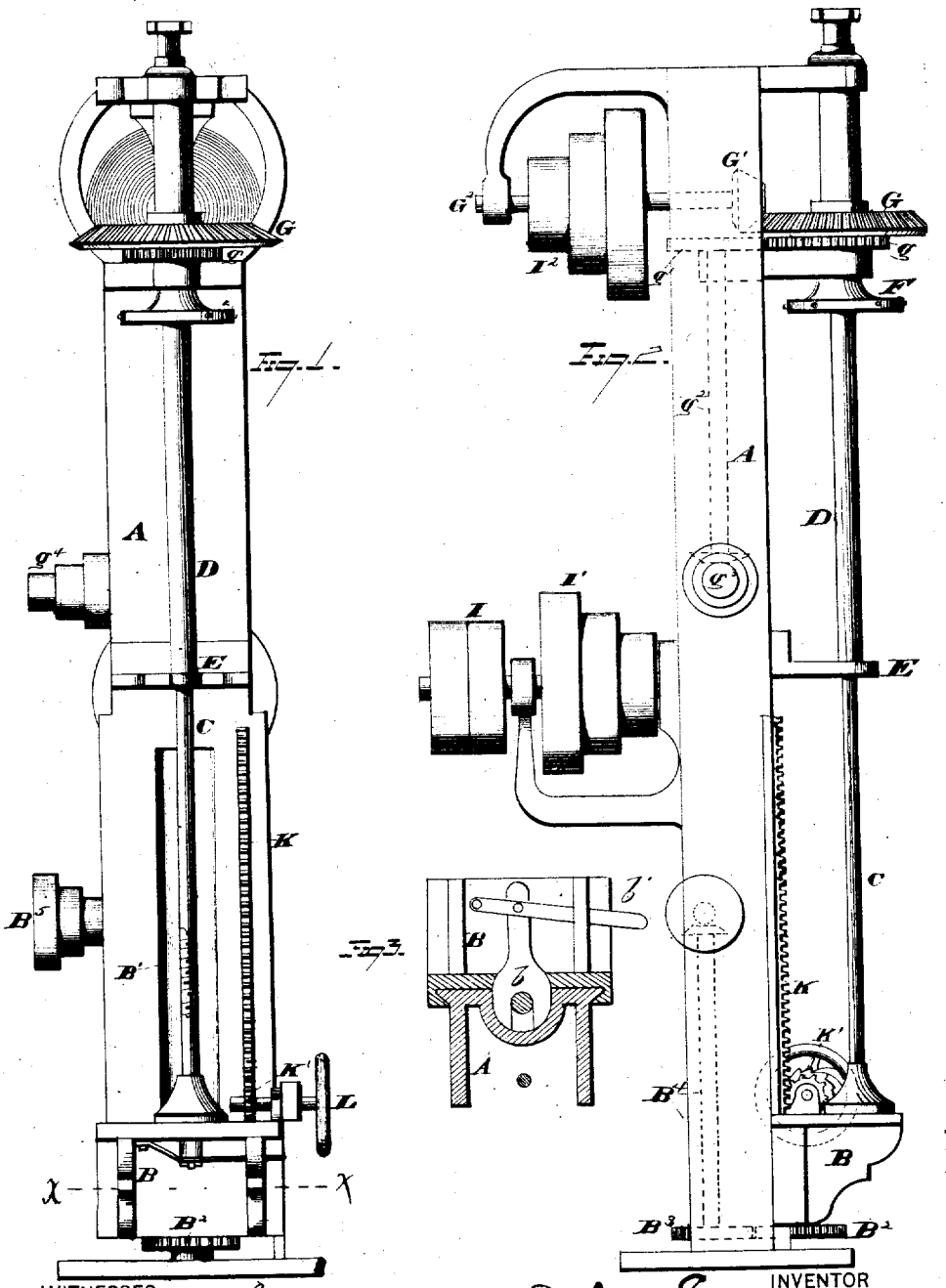
WITNESSES
E. G. Nottingham
A. Wright.
INVENTOR
John Simpson
By Leggett & Leggett
ATTORNEYS

UNITED STATES PATENT OFFICE.

JOHN SIMPSON, OF MEADVILLE, PENNSYLVANIA, ASSIGNOR OF ONE-HALF INTEREST TO DICK & CHURCH, OF SAME PLACE.

IMPROVEMENT IN METAL-BORING MACHINES.

Specification forming part of Letters Patent No. 124,091, dated February 27, 1872; Reissue No. 7,819, dated July 31, 1877; application filed May 19, 1877.

*To all whom it may concern:*

Be it known that I, JOHN SIMPSON, of Meadville, in the county of Crawford and State of Pennsylvania, have invented a certain new and useful Improvement in Boring-Machines for Making Working-Cylinders or Working-Barrels for Pumps, Oil-Wells, Steam-Engines, &c., and the following is a full, clear, and exact description of the same, reference being had to the accompanying drawings, which make a part of this specification.

My invention relates more particularly to a vertical drill, so constructed that the drilling shall be perfectly true and cylindrical.

In the drawing, Figure 1 is a front view of a machine embodying my invention; Fig. 2, a side view of the same; Fig. 3, a section on the line *x x*, showing parts in elevation.

A is a vertical frame, which supports the working part of the machine. It is made of metal of proper form and proportions to be sufficiently strong and durable. B is a vertically-sliding bed which carries the drill C. The bed B projects backward, and bears a nut through which an upright screw-shaft, $B^1$, passes, this screw-shaft $B^1$ being the shaft of a gear-wheel, $B^2$, at its base, and by which it is revolved. The revolution of the screw-shaft $B^1$ causes the bed B to slide up or down, thereby feeding the drill C forward to its work.

D is the device that is being drilled or bored, as, for instance, a working cylinder or barrel for pump, for oil-well, or steam-engine, &c. Its lower end rests upon or within a suitable support, E, and is there properly centered for the drill C. Its upper end is secured by the chuck or mandrel F. On the shaft of the mandrel F is a bevel-gear wheel, G, and a spur-gear, *g*. The bevel-gear G meshes with the bevel-pinion $G^1$ on the pulley-shaft $G^2$. The spur-gear *g* meshes with a pinion, $g^1$, on the shaft $g^2$, which, in turn, is connected with bevel-gears to the pulley-shaft $g^3$. $g^4$ is a set of belt-pulleys corresponding with a reverse set of pulleys, $B^5$. The shaft of the pulleys $B^5$ connects by bevel-gears with the shaft $B^4$, which is provided at the bottom with a pinion, $B^3$, meshing with the spur-gear $B^2$, which revolves the screw-shaft $B^1$. *b* is a nut attached to the sliding bed B, and which may be thrown in or out of gear with the screw-shaft $B^1$ by means of the lever $b^1$. I is the drive-pulley, and operates the gangs of variable pulleys $I^1$ $I^2$.

The operation of the device is as follows: The article D to be bored is placed in proper position on the end of the drill at the support E. Its upper end is then chucked with the mandrel F. Power is applied to the pulley I, and communicated through the pulley $I^1$ to the pulley $I^2$. This operates the shaft $G^2$ and pinion $G^1$, which, by meshing into the bevel-gear G, causes the mandrel F and article D to revolve about its axis. The spur-gear *g* puts in motion the shaft $g^2$ and pulleys $g^4$. The belt leading from the pulleys $g^4$ to the pulleys $B^5$ causes the shaft $B^4$ to revolve, which in turn gives motion to the vertical feed-screw $B^1$. The bed, however, does not move upward until the nut *b* has been thrown into gear with the screw-shaft by means of the lever $b^1$. When this is done, however, the bed B moves upward and feeds the drill C into article D.

It will be observed that the drill C does not revolve, but the article D, itself, revolves. The effect is that the drill will move forward in a perfectly true direction, neither varying one side nor the other, and will bore out a true cylinder.

In machines that are not vertical the shavings that are removed by the drill cannot fall by gravity out of the barrel or chamber, but become packed about the drill so as to impede its progress, and also serve to wedge it away from a true line of direction.

In my drill the shavings or borings drop away as loosened, and it is therefore capable of doing faster and better work.

By the adjustment of the belt upon the variable pulleys $I^1$ $I^2$ the machine may be made to operate slower or faster with the same speed of the power-shaft. So, also, by adjusting the belt upon the variable pulleys $g^4$ and $B^5$, the feed screw $B^1$ may be revolved at a greater or less speed, and thereby feed the cylinder to the work faster or slower, as may be desired. The revolution of the article D, that is being bored, also serves to effect a perfectly true cylindrical boring.

K is a rack attached to the face of the machine. K′ is a pinion meshing therewith, and L a hand-wheel on the shaft of the pinion, by means of which, when the nut *b* is disengaged, the drill may be fed upward or withdrawn by hand at will.

What I claim is—

1. A boring-machine for making working cylinders or barrels for pumps, oil-wells, steam-engines, &c., consisting of a vertical drill, in combination with a vertical chuck and mandrel, located above the drill, and constructed to support the article to be bored, and feeding mechanism for feeding the drill upward, substantially as and for the purposes described.

2. In a boring-machine for making working cylinders or barrels for pumps, oil-wells, steam-engines, &c., a vertical drill and a vertical chuck located above the drill for supporting the article to be bored and causing it to revolve about its vertical axis, in combination with mechanism for feeding the drill upward, substantially as and for the purposes described.

3. In a boring-machine for making working cylinders or barrels for pumps, oil-wells, steam-engines, &c., a vertical non-revolving drill, together with a vertical chuck or mandrel located above the drill, and constructed to support and revolve the article to be bored, in combination with mechanism for feeding the said drill upward, substantially as and for the purposes described.

4. In a boring-machine for making working cylinders or barrels for pumps, oil-wells, steam-engines, &c., the vertical drill C, support B, and feed screw or shaft $B^1$, in combination with the vertical revolving chuck or mandrel F, and variable feed devices $B^3$ $g^4$, with intermediate connections, whereby the rapidity of the drill-feed may be varied, as desired, with respect to the rapadity of revolution of the chuck or mandrel, substantially as and for the purposes described.

5. In a boring-machine, the combination, with a vertical chuck or mandrel located above the drill, and constructed to support and revolve the article to be bored, a vertically-adjustable drill-support, and non-revolving drill, of the feed-screw or shaft $B^1$, adjustable nut *b*, and device $b^1$, for engaging or disengaging the nut at pleasure, substantially as described.

6. In a boring-machine, the combination, with a vertical chuck or mandrel located above the drill, and constructed to support and revolve the article to be bored, a vertically-adjustable drill-support, and non-revolving drill, of the stationary rack K, pinion K′, and hand-wheel L, said pinion and hand-wheel secured to a shaft journaled in bearings attached to the drill-support, substantially as described.

JOHN SIMPSON.

Witnesses:
H. ROSSITER,
W. O. TUBBS.